United States Patent
Chung et al.

(10) Patent No.: US 8,490,061 B2
(45) Date of Patent: Jul. 16, 2013

(54) PROFILING APPLICATION PERFORMANCE ACCORDING TO DATA STRUCTURE

(75) Inventors: I-Hsin Chung, Yorktown Heights, NY (US); Guojing Cong, Ossining, NY (US); Kattamuri Ekanadham, Mohegan Lake, NY (US); David Klepacki, New Paltz, NY (US); Simone Sbaraglia, Rome (IT); Hui-Fang Wen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 12/436,894

(22) Filed: May 7, 2009

(65) Prior Publication Data

US 2010/0287536 A1 Nov. 11, 2010

(51) Int. Cl.
 *G06F 9/44* (2006.01)
 *G06F 13/00* (2006.01)
 *G06F 13/28* (2006.01)
 *G06F 9/46* (2006.01)

(52) U.S. Cl.
 USPC ........... 717/128; 711/154; 711/202; 717/124; 717/130; 718/108

(58) Field of Classification Search
 None
 See application file for complete search history.

(56) References Cited

U.S. PATENT DOCUMENTS

| | | | | |
|---|---|---|---|---|
| 5,274,811 A | * | 12/1993 | Borg et al. | 717/128 |
| 6,351,845 B1 | * | 2/2002 | Hinker et al. | 717/128 |
| 6,430,741 B1 | * | 8/2002 | Mattson et al. | 717/154 |
| 7,739,668 B2 | * | 6/2010 | Cruickshank et al. | 717/128 |
| 7,908,591 B1 | * | 3/2011 | Nell et al. | 717/130 |
| 8,037,363 B2 | * | 10/2011 | Williams et al. | 717/128 |
| 8,060,869 B1 | * | 11/2011 | Panchenko et al. | 717/158 |
| 2002/0147965 A1 | * | 10/2002 | Swaine et al. | 717/124 |
| 2007/0180215 A1 | * | 8/2007 | Cascaval et al. | 711/202 |
| 2007/0234307 A1 | * | 10/2007 | Luk et al. | 717/130 |
| 2009/0044176 A1 | * | 2/2009 | Cascaval et al. | 717/128 |
| 2009/0083715 A1 | * | 3/2009 | DeWitt et al. | 717/128 |
| 2009/0133033 A1 | * | 5/2009 | Lindo et al. | 718/108 |
| 2010/0146220 A1 | * | 6/2010 | Panchenko et al. | 711/154 |

OTHER PUBLICATIONS

Margaret Martonosi et al., MemSpy: analyzing memory system bottlenecks in programs, ACM SIGMETRICS Performance Evaluation Review, 1992 [Retrieved on Mar. 1, 2013]. Retrieved from the internet: <URL: http://dl.acm.org/citation.cfm?id=133079> 12 Pages (1-12).*

(Continued)

*Primary Examiner* — Don Wong
*Assistant Examiner* — Anibal Rivera
(74) *Attorney, Agent, or Firm* — Anne V. Dougherty; Ryan, Mason & Lewis, LLP

(57) ABSTRACT

During runtime of a binary program file, streams of instructions are executed and memory references, generated by instrumentation applied to given ones of the instructions that refer to memory locations, are collected. A transformation is performed, based on the executed streams of instructions and the collected memory references, to obtain a table. The table lists memory events of interest for active data structures for each function in the program file. The transformation is performed to translate memory addresses for given ones of the instructions and given ones of the data structures into locations and variable names in a source file corresponding to the binary file. At least the memory events of interest are displayed, and the display is organized so as to correlate the memory events of interest with corresponding ones of the data structures.

25 Claims, 8 Drawing Sheets

OTHER PUBLICATIONS

Roman Lysecky et al., A fast on-chip profiler memory, ACM 2002, [Retrieved on Mar. 1, 2013]. Retrieved from the internet: <URL: http://dl.acm.org/citation.cfm?id=513928> 5 Pages (28-33).*

Derose et al., SIGMA: A Simulator Infrastructure to Guide Memory Analysis, Proceedings of the IEEE/ACM SC2002 Conference (SC'02), pp. 1-13.

Sbaraglia et al., pSigma: An Infrastructure for Parallel Application Performance Analysis using Symbolic Specifications, pp. 15-20, IEEE 2002.

Xu et al., Shared-Memory Performance Profiling, 6th ACM SIGPLAN Symposium on Principles and Practice of Parallel Programming, 1997, 12 pages.

Derose et al., An Approach for Symbolic Mapping of Memory References, M. Danelutto et al., (Eds.): Euro-Par 2004, LNCS 3149, pp. 141-148, 2004.

Intel Parallel Studio Home, Intel Software Network, http://software.intel.com/en-us/intel-parallel-studio-home/, Retrieved date May 6, 2009.

* cited by examiner

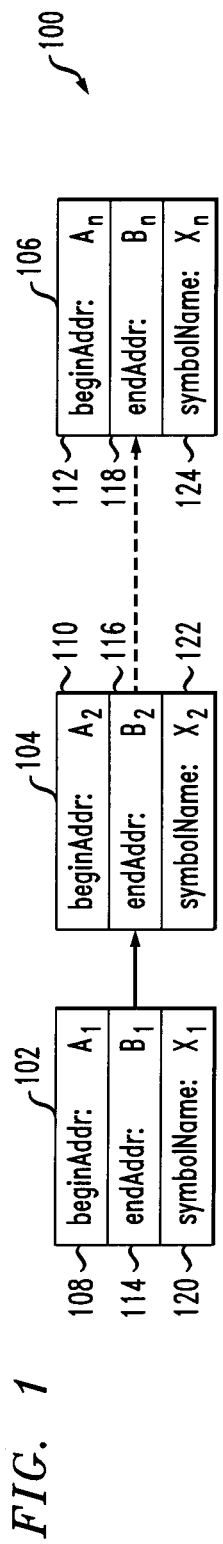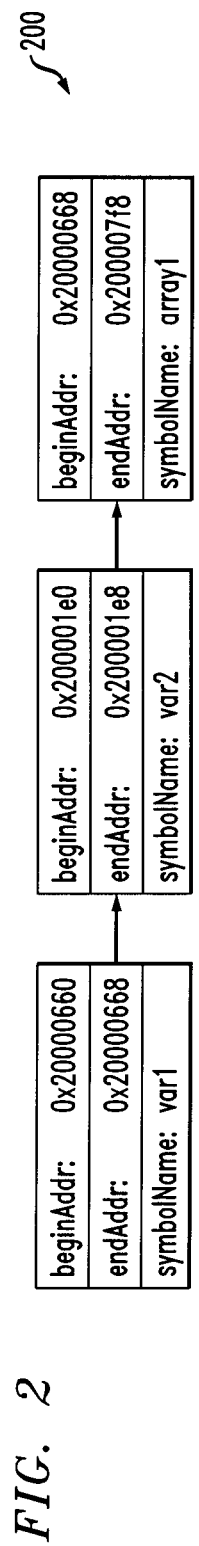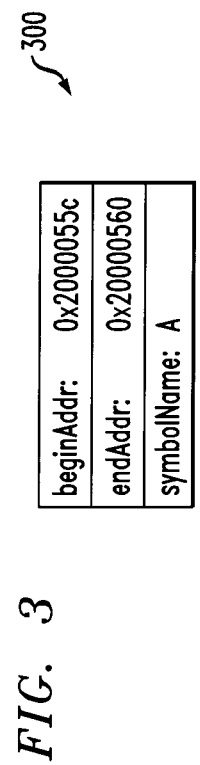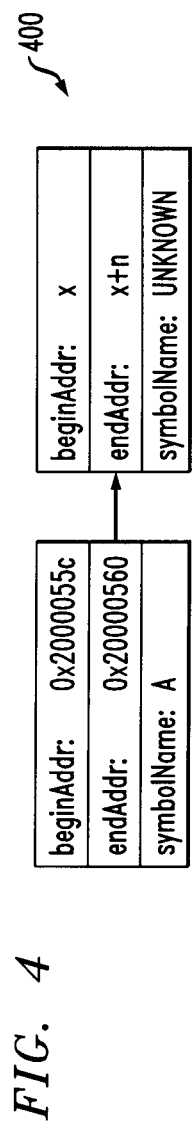
FIG. 1
FIG. 2
FIG. 3
FIG. 4

FIG. 7

PROFILING APPLICATION PERFORMANCE ACCORDING TO DATA STRUCTURE

FIELD OF THE INVENTION

The present invention relates to the electrical, electronic and computer arts, and, more particularly, to quantifying and improving performance of computer programs.

BACKGROUND OF THE INVENTION

Understanding and tuning memory system performance is of interest, for most programs, so as to achieve reasonable performance on current high performance systems. Traditionally, performance measurement and visualization tools have been control-centric, since they focus on the control structure of the programs (e.g., loops and functions). This is also where application programmers have typically concentrated when searching for performance bottlenecks. However, due to the advances in microprocessors and computer system design, there has been a shift in the performance characteristics of scientific programs from being computation bounded to being memory and/or data-access bounded.

SUMMARY OF THE INVENTION

Principles of the invention provide techniques for profiling application performance according to data structure. In one aspect, an exemplary method (which can be computer-implemented) includes the steps of, during runtime of a binary program file, executing streams of instructions from the binary program file; and collecting memory references generated by instrumentation applied to given ones of the instructions that refer to memory locations. The method further includes performing a transformation, based on the executed streams of the instructions and the collected memory references, to obtain a table, the table listing memory events of interest for active data structures for each function in the program file. The transformation is performed to translate memory addresses for given ones of the instructions and given ones of the data structures into locations and variable names in a source file corresponding to the binary file. Also included is facilitating display of at least the memory events of interest. The display is organized to correlate the memory events of interest with corresponding ones of the data structures.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or more of the following technical benefits: understanding data movement in the memory hierarchy, understanding memory and/or cache usage, and understanding the performance impact for specific data structure(s). The information will be useful, for example, for performance tuning for the application programs.

These and other features, aspects and advantages of the invention will become apparent from the following detailed description of illustrative embodiments thereof, which is to be read in connection with the accompanying drawings.

BRIEF DESCRIPTION OF THE DRAWINGS

FIGS. 1 & 2 show tables to map memory addresses to symbolic names, according to an aspect of the invention;

FIG. 3 shows a table entry for a pointer declaration, according to another aspect of the invention;

FIG. 4 shows a table entry after a dynamic allocation at address x of size n, according to yet another aspect of the invention;

FIG. 7 shows data structures in a sample application, their relation to functions in the application, and a detailed breakdown of their performance with respect to a memory architecture on which the application is executed (such as load and store misses, access times, and the like), according to yet a further aspect of the invention;

DETAILED DESCRIPTION OF PREFERRED EMBODIMENTS

Figure 5:
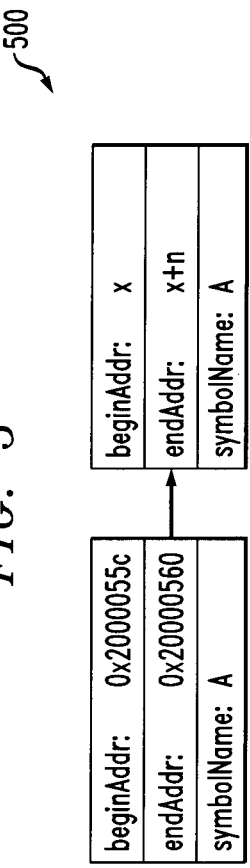
FIG. 5 shows a table entry of a dynamically allocated variable after symbolic mapping, according to a further aspect of the invention.

Aspects of the invention aid in understanding and tuning memory system performance, which can be a significant issue for applications. One or more embodiments provide data-centric performance profiles that can help users understand which memory references in their program are causing poor utilization of the memory hierarchy. Fine-grained information such as this is useful, for example, for tuning loop kernels, understanding the cache behavior of new algorithms, and/or to investigate how different parts of a program and its data structures compete for and interact within the memory subsystem. Currently, no solutions exist that can provide the user with a data-centric performance profile that identifies the data structures as defined in the source application and their performance with respect to the memory system. The lack of such tools is believed to be due, at least in part, to a traditional "control-centric" way of interpreting application performance profiling and/or due to the significant technical difficulties that have to be overcome to provide such a data-centric view of application performance.

One or more embodiments of the invention provide techniques for presenting memory performance data organized by data structures defined at the source level of the application rather than by control flow structures such as functions and loops. Such a "data-centric profile" is advantageous for programmers to understand the interaction of their data structures with the memory subsystem and therefore for them to assess and improve the performance resulting from the mapping of the addresses onto the machine and the memory hierarchy. As noted, application performance profiles have traditionally been "control-centric," focusing on the source functions and loops rather than data structures. However, due to the advances in microprocessors and computer system design, there has been a shift in the performance characteristics of scientific programs from being computation bounded to being memory and/or data-access bounded. This shift makes the traditional approach less effective.

As also noted above, in order to provide such a data-centric view of the application performance, significant technical difficulties have to be overcome. Namely, whenever a memory reference is made, the address of the referenced memory has to be associated with the symbolic name of the data structure that corresponds to the reference. Such mapping is difficult to obtain, due to the dynamic nature of data addresses, and the need to support local variables (which can be placed at different depths within the stack) and dynamically allocated variables, whose virtual address is not known statically at compile time. Such difficulties make rendering data-centric profiles rather difficult. In contrast, to provide a control-centric profile, the address of the instruction that made the reference has to be associated with the corresponding source line in the program. Such a mapping is readily available by analyzing the line number and symbol table stored in the executable code, therefore making control-centric profiling easier to implement.

Heretofore, there has been no known solution to the problem of determining the data structures, as defined in the source application, that are causing poor utilization of the memory system, as is possible in one or more embodiments of the invention.

Figure 7:
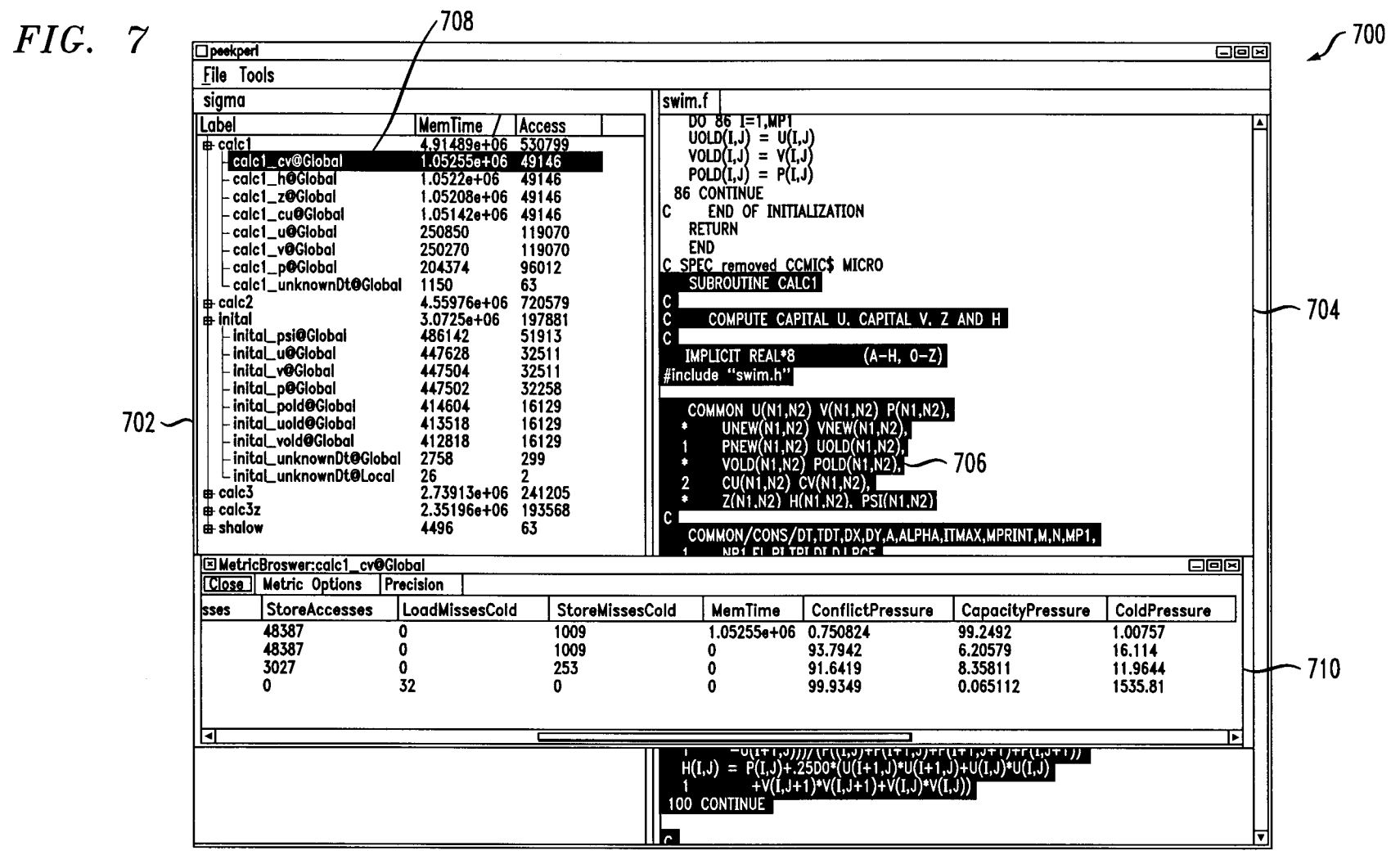

FIG. 7 shows an exemplary screen shot of data structures, according to an aspect of the invention. A frame of reference is generated for understanding the performance of an application based on the movement of the data structures within it. The screenshot 700 in FIG. 7 shows the data structures in a sample application, their relation to the functions in the application, and a detailed breakdown of their performance with respect to the memory architecture on which the application is executed (for example, load and store misses, access times, and the like). In particular, top left panel 702 shows the data structure with associated memory performance. Top right panel 704 shows the source code. The highlighted region 706 corresponds to the selected (highlighted) data structure 708 in the top left panel 702. The pop-up window 710 in the bottom shows detailed memory performance for the selected data structure 708 in the top left panel 702. Heretofore, profilers could only show how much time was spent in a particular function, with no information specific to the data structures. FIG. 7 thus represents a non-limiting example of a display of memory events of interest, organized data-centrically, that is, to correlate the memory events of interest with the corresponding data structures.

In order to provide a data centric profile of the application memory performance, it is advantageous to provide a method for associating each data memory address with the symbolic name of the data structure, as defined in the source code, which the address corresponds to. Furthermore, this method preferably encompasses both statically and dynamically allocated variables and both heap- and stack-allocated variables.

In one or more embodiments of the invention, two main components are employed, namely, a pre-execution instrumentation utility that reads the binary file to locate and instrument all instructions that refer to memory locations, and a runtime data collection engine that collects the streams of instructions and memory references generated by the instrumentation and performs the symbolic mapping. In one or more embodiments, the pre-execution instrumentation utility 850 is located between the application binary 802 and instrumented application binary 804, while the runtime data collection engine 852 is located between the instrumented application binary 804 and the instruction and memory address references 806, as will be discussed below with respect to FIG. 8. The pre-execution binary instrumentation can be achieved, for example, using the "pSigma" instrumentation facility. The skilled artisan will be familiar with same, from, for example, "pSigma: An Infrastructure for Parallel Application Performance Analysis using Symbolic Specifications," by Simone Sbaraglia, Kattamuri Ekanadham, and Saverio Crea, as presented at the EWOMP 2004 conference (Sixth European Workshop on OpenMP, KTH Royal Institute of Technology, Stockholm, Sweden, Oct. 18-22, 2004). The pSigma instrumentation facility is an example of a binary patching and/or rewriting tool. Binary patching and/or rewriting is known per se to the skilled artisan, who, given the teachings herein, will be able to adapt same for use with one or more embodiments of the invention. The pSigma instrumentation facility is an instrumentation technology that uses binary rewriting to insert measurement probes.

In one or more embodiments, a runtime symbolic conversion engine 808 performs the transformation:

$$(\text{instructionAddress}, \text{dataAddress}) \Rightarrow (\text{sourceLine}, \text{varName}, \text{arrayElement}) \quad (1)$$

The ellipsis in (1) indicates that in the typical case, there are many addresses which need to be translated into source line numbers.

The runtime symbolic conversion engine further maintains a table where each column represents an active data structure and each row represents a function in the program. Each entry in the table contains counters for the memory events of interest, such as cache accesses, hits, and misses. Once the symbolic transformation (1) is completed, the counters for the entry corresponding to the source line sourceLine and the data structure varName are updated, for example, by symbolic mapping module 808 writing the information into the memory profiling block 810. If the variable is an array, the precise element references are also made available.

In order to perform the transformation:

$$\text{dataAddress} \Rightarrow \text{varName} \quad (2)$$

a linked list 100 shown in FIG. 1 is built and maintained, for example, by modules 808 and 852 acting together. Each entry 102, 104, 106 in linked list 100 corresponds to an allocated virtual address range (beginning specified in 108, 110, 112 respectively and ending specified in 114, 116, 118 respectively) and carries the information about the symbolic name 120, 122, 124, respectively, of the data structure that corresponds to each address range. When an address "a" is accessed, the runtime engine searches the list for an entry "i" such that $a_i \leq a < b_i$, in order to match the reference to the data structure $x_i$.

Since data structures can be allocated and de-allocated dynamically, this list should be dynamically updated at runtime. Moreover, the instrumentation engine 850 should capture the information about allocations and de-allocations. A further difficulty is presented by the fact that stack variables are not identified by a global address range, but rather by an offset within the stack pointer of the function where they are defined.

A non-limiting example will now be provided to illustrate techniques to support the mapping of each data address to the corresponding symbolic name of the data structure. In this non-limiting example, the description is divided into three parts: techniques for mapping of global variables, techniques for mapping of dynamically allocated variables, and techniques for mapping of stack variables. The non-limiting examples are based on the IBM compilers for AIX® software (registered mark of International Business Machine Corporation, Armonk, N.Y., USA) and their binary representation (XCOFF—extended common object file format), but given the teachings herein, the skilled artisan can readily extend the techniques to other environments.

Mapping Global Variables

Global variables are allocated in the Data Segment of the binary, where the information about the virtual address assigned to each variable and its size is completely known at link time. If the program is compiled with the debugger argument -g, this information is stored by the compiler in the executable in the form of tables. Hence, by analyzing these tables, it is possible to build the linked list 100 of FIG. 1 statically before the application starts executing. For example, consider the following C pseudocode:

```
double var1;
double var2 = 1;
int array1[100];
int main(int argc, char *argv[ ]) ...
```

By analyzing the symbol table of the compiled executable, the following entries, which refer to the data structure var1, are found:
Symbol Class=C EXT Value=0x20000660 Name=var1
Stab Class=C GSYM Value=0x00000000 Name=var1:G-13

The first entry classifies the symbol var1 as a variable statically allocated at the virtual address 0x20000660. The second entry identifies the variable as a global variable (symbol G) of type −13, which is the internal code for double. It can therefore be inferred that the variable var1 will be attributed the address range [0x20000660, 0x20000668] and an entry in the linked list can be built. Similarly, the array array1 and the variable var2 are represented as:
Symbol Class=C EXT Value=0x200001e0 Name=var2
Stab Class=C GSYM Value=0x00000000 Name=var2:G-13
Symbol Class=C EXT Value=0x20000668 Name=array1
Stab Class=C GSYM Value=0x00000000 Name=array1:G6
Stab Class=C DECL Value=0x00000000 Name=:t6=ar0;0;99;−1
where the last Stab entry defines the type 6 as an array 0, . . . , 99 of integers. The table 200 for this binary is shown in FIG. 2.

Mapping Dynamically Allocated Variables

Normally, the sizes of dynamic data structures depend on user input and are often unknown at compile time. Moreover, a data structure size may need to be changed during the program execution. Hence, an address range of a dynamically allocated data structure is assigned to the variable at runtime, and cannot be deduced uniquely from the executable tables. Furthermore, allocated variables can be "released" when they are no longer needed, and the same address range (or a subset of it) can be re-assigned to some other dynamic variable.

In order to account for such situations, it is advisable to expand an instrumentation utility to capture the allocation and de-allocation requests, the address range allocated or freed, and the symbolic data structure that is bound from time to time to the address range. To illustrate the technique, consider the following C example and its corresponding entries in the symbol table:

```
int *A;
A = (int *)malloc(n);
    Stab Class = C DECL Value = 0x00000000 Name = :t4=*−1
    Symbol Class = C EXT Value = 0x2000055c Name = A
    Stab Class = C GSYM Value = 0x00000000 Name = A:G4
```

The symbol table of the executable contains an entry for the global variable A (of type 4, i.e., pointer to integer, as specified in the first Stab entry), which is associated to the virtual address 0x2000055c. When the malloc function is called, it returns the address of the newly allocated address range. By intercepting this return address at runtime and the corresponding argument passed to malloc, it can be inferred that a new address range [x,x+n] has been allocated. Unfortunately, the malloc call does not directly provide any information about the symbolic name that the new address range is associated with. However, the compiler usually stores the new address into the memory location identified by A.

Note, for the avoidance of doubt, that "["or"]" means inclusive, "("or")" means exclusive, and [x, x+n) means (includes) x, x+1 . . . x+n−1 (i.e., for all i that x≦i<x+n).

The code generated for the malloc call is usually of the following type, where R3 indicates the register that is used to pass the first argument to a function and to collect its return code:
store n into R3
call malloc (which returns the address x in the register R3)
store R3 into 0x2000055c An optimizing compiler might avoid storing the address and just keep it in a register. In this case, it is not feasible to bind the address range with the symbolic name, and such references can be classified as belonging to a dynamically allocated area whose name is unknown. In practice, however, this situation only occurs when the allocated memory is used for a very limited amount of time and then released, and is not encountered often in real applications where the allocated memory is heavily reused (for example in a loop) before being released.

The technique to track dynamically allocated memory is the following: first, by analyzing the executable tables, create an entry 300 for A, as shown in FIG. 3. Second, from the malloc instrumentation, obtain the parameter passed to malloc (size n) and the returning value (address X), and instantiate an entry 400, as shown in FIG. 4, where the name is still undefined. Then, when a store instruction: "store x into a" is executed, search the list for an entry whose name is undefined and which has X in the begin address of its range. If such an entry is found, infer that the address range is now associated with the data structure whose virtual address is a. In the example above, when "store R3 into 0x2000055c" is executed, change the list 400 by assigning the name A to the allocated variable to obtain the list 500, as shown in FIG. 5.

Finally, each time when free is called, capture the address passed to it and search the table for an entry that corresponds to it. Then remove the entry from the table, since it is no longer "active."

Mapping Stack Variables

Figure 13:
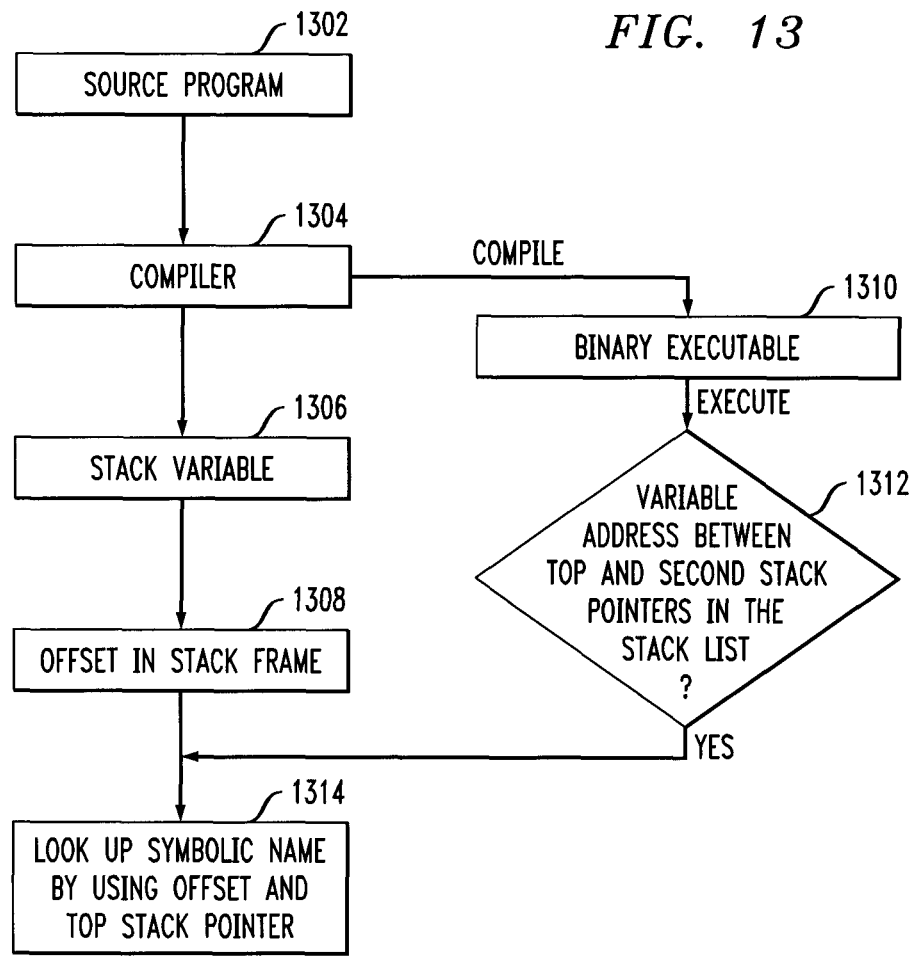

With reference to FIG. 13, when a stack variable 1306 is declared in the source code 1302, such as an automatic variable in C or a local variable in Fortran 90, the virtual address that will be assigned to the variable will depend on the position of the stack pointer when the function is called, and such virtual address is therefore unknown at compile time, when compiler 1304 compiles the source 1302 to obtain binary executable 1310. However, as shown at 1308, the compiler stores in the executable the offset of each stack variable in the stack frame. For instance, the pseudo code:

```
int foo(void)
int var1;
int array1[100];
...
would carry in the executable the following symbols:
Stab Class= CFUN Value= 0x00000000Name= foo:F-1
SymbolClass= CFCN Value= 0x100003d4Name= .bf
Stab Class= CLSYM value= 0x00000040Name= var1:-1
Stab Class= CLSYM Value= 0x00000048Name= array1:3
Stab Class= CDECL Value= 0x00000000Name= :t3=ar0;0;99;-1
SymbolClass= CFCN Value= 0x100003f0Name= .ef
``` which identify var1 as a symbol defined locally in the function foo. The symbol var1 is a symbol of type int, allocated at offset 0x40 in the stack frame, and array1 is an array 0, . . . , 99 of integers, allocated at offset 0x48. The .bf and .ef symbols denote the beginning and the end of a function variable definition.

A local variable is therefore defined by a pair (function, offset), where function indicates the function where the variable is defined and offset indicates the stack offset where the variable will be allocated. In order to map stack memory references to the symbol associated with them, it is advantageous to be able to identify, for each stack reference, the stack offset of the reference and the function whose stack frame is being accessed.

Figure 6:
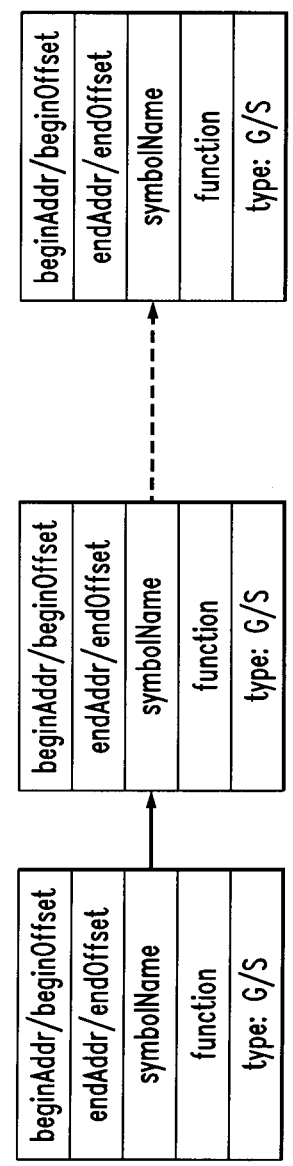
FIG. 6 shows another table to map memory addresses to symbolic names, according to a still further aspect of the invention.

An exemplary approach is as follows: first, the table in each node of the linked list of FIG. 1 is extended to accommodate the information about local variables, as shown in table 600 of FIG. 6.

The beginAddr and endAddr fields are interpreted as absolute addresses or offsets, depending whether the variable is a global or local symbol (G or S in the type field). The field function indicates the function where the variable was declared and is empty for global variables.

Second, extend the instrumentation utility to fetch the value of the stack pointer. Each time the stack pointer changes, record the event as a couple (stkPointer, function) where stkPointer is the new value of the stack pointer and function is the function that is currently executing.

During execution, maintain an internal stack structure called stkList. Each time the stack pointer changes, search the stkList from the top and if an entry is found that matches the current stack pointer, make that entry the top of the stkList. Otherwise, add the current couple (stkPointer, function) to the top of the stkList.

For instance, consider the following call and return sequence:
f1( )→f2( )→f3( )→f2( )→f1( )
and further assume, for the sake of simplicity, that there are no stack pointer changes other than the ones involved in the function calls and returns.

When f1 is called, a new stack pointer s1 is allocated. Capture the stack pointer change and create an entry (f1,s1) in the stkList. Then, when f2 is invoked, and therefore a new stack pointer s2 is allocated, add it to the stack: (f1,s1)→(f2, s2)

Similarly, for f3, update the table as (f1,s1)→(f2,s2)→(f3, s3). When f3 returns, its stack frame is popped and the new value of the stack pointer becomes s2. Then delete the entry from the list: (f1,s1)→(f2,s2) and so on. In this way, if the function f2 accesses a variable whose address x is, say, in the range [s1,s2) it is possible to immediately identify it as a reference to a variable declared in f1. Then search the symbolic linked list for an entry whose function field equals f1 and such that beginOffset≦x≦endOffset.

The preceding functionality is depicted by decision block 1312, with "YES" branch leading to block 1314 (in the "NO" branch, omitted for brevity, process normally).

In an exemplary embodiment, an illustrative approach includes two main components: a pre-execution instrumentation utility that reads the binary file to locate and instrument all instructions that refer to memory locations and a runtime data collection engine that collects the streams of instructions and memory references generated by the instrumentation and performs the symbolic mapping. The pre-execution binary instrumentation can be achieved, for example, using the above-mentioned "pSigma" instrumentation facility. The runtime symbolic conversion engine performs the transformation (1) and maintains a simulation table where each column represents an active data structure and each row represents a function in the program. With the given memory configuration, each entry in the table will contain counters for the memory events of interest, such as cache accesses, hits, and misses. As previously noted, once the symbolic transformation (1) is completed, the counters for the entry corresponding to the source line sourceLine and the data structure varName are updated, for example, by symbolic mapping module 808 writing the information into the memory profiling block 810. If the variable is an array the precise element references are also available. All the information is later output as the memory profile.

It will thus be appreciated that aspects of the invention provide a data-centric performance profiling method. To obtain the required information, one exemplary approach includes a pre-execution instrumentation utility 850 (for example, the above-mentioned pSigma instrumentation utility) that reads the binary file 802 to locate and instrument all instructions that refer to memory locations, as well as a runtime data collection engine 852 that collects the streams of instructions and memory references generated by the instrumentation and performs the symbolic mapping 808 (for example, by performing the transformation in equation (1) above). A table can be maintained where each column represents an active data structure and each row represents a function in the program. Each entry in the table can contain counters for the memory events of interest, such as cache accesses, hits, and misses. As previously noted, once the symbolic transformation (1) is completed, the counters for the entry corresponding to the source line sourceLine and the data structure varName are updated, for example, by symbolic mapping module 808 writing the information into the memory profiling block 810. If the variable is an array the precise element references are also available.

In some instances, with regard to the transformation (1), when an address "a" is accessed, the runtime engine searches the list for an entry "i" such that beginAddr_i≦a<endAddr_i, in order to match the reference to the data structure X_i. The list can be dynamically updated at runtime, since data structures can be allocated and de-allocated dynamically. The instrumentation engine mentioned above should capture the information about allocations and de-allocations. In one or more embodiments, stack variables are not identified by a global address range, but rather by an offset within the stack pointer of the function where they are defined.

The mapping of each data address to the corresponding symbolic name of the data structure described above may include, for example, three parts, namely the technique for mapping of global variables, the technique for mapping of dynamically allocated variables, and the technique for mapping of stack variables. The technique for mapping of global variables may use the information from the Data Segment of the binary, where the information about the virtual address assigned to each variable and its size is completely known at link time. The technique for mapping of dynamically allocated variables may use the information captured from the allocation and de-allocation requests, the address range allocated or freed, and the symbolic data structure that is bound from time to time to the address range. The technique for mapping of stack variables may use the information from the stack. When a stack variable is declared in the source code, such as an automatic variable in C or a local variable in Fortran 90, the virtual address that will be assigned to the variable will depend on the position of the stack pointer when the function is called, and the compiler stores in the executable the offset of each stack variable in the stack frame.

Thus, an exemplary data-centric performance profiling technique includes a pre-execution instrumentation utility 850 that reads the binary file 802 to locate and instrument all instructions that refer to memory locations and a runtime data collection engine 852 that collects the streams of instructions and memory references generated by the instrumentation and performs the symbolic mapping.

Figure 8:
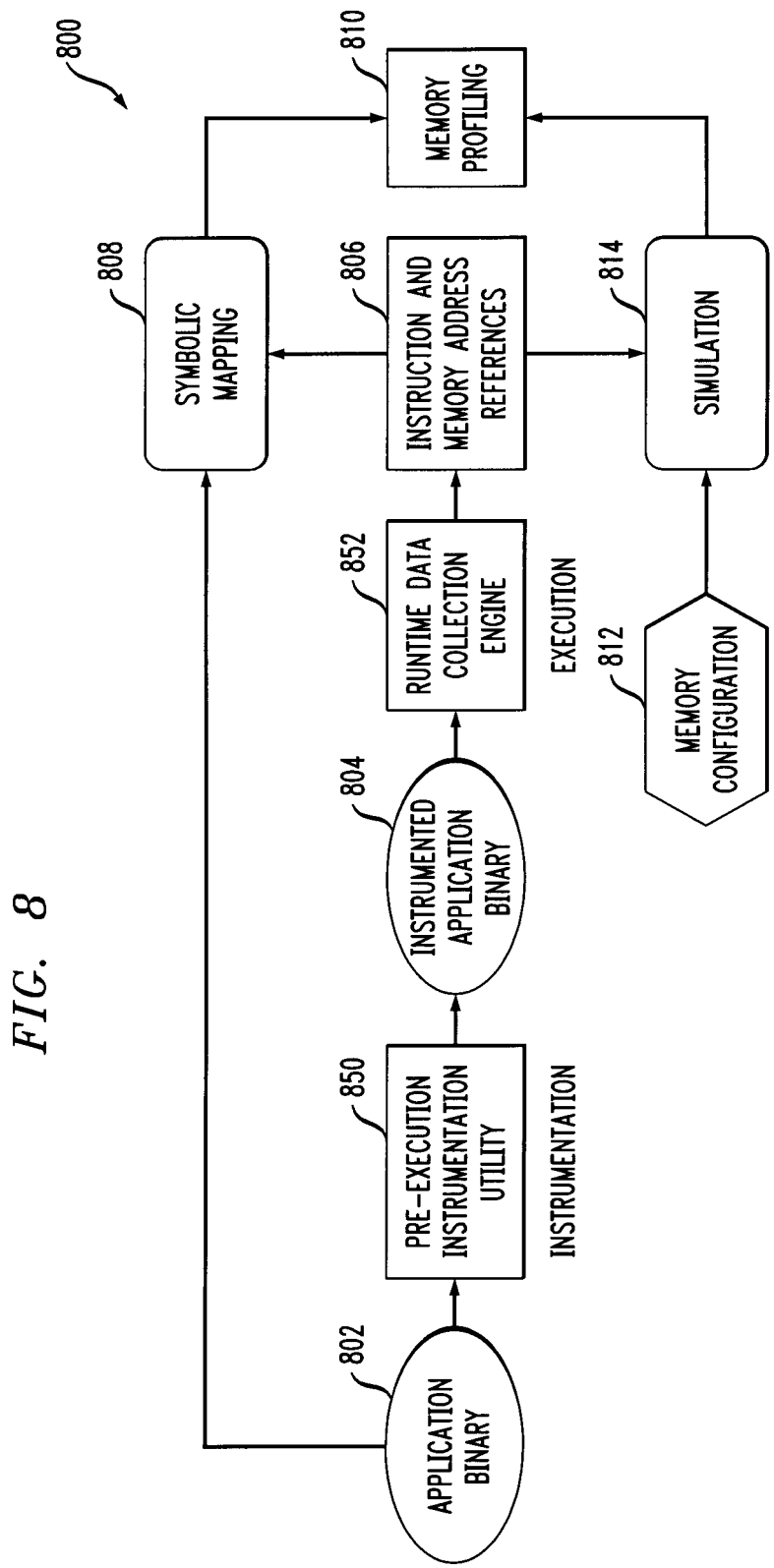
FIG. 8 shows an exemplary combined data flow and block diagram for memory profiling, according to an even further aspect of the invention.

With reference now to diagram 800 of FIG. 8, application binary 802 is the binary executable of the application of interest, while instrumented application binary 804 is the patched binary executable of the application. Instrumented application binary 804 is modified so bookkeeping will be invoked whenever the application binary 802 has memory access. Utility 850 performs the instrumentation. Instruction and memory address references 806 include the information collected from the bookkeeping carried out in block 804; in one or more embodiments, a long log of memory addresses. The references may be collected by the runtime data collection engine 852.

Symbolic mapping block 808 takes memory addresses and maps the addresses to the source line number, with help from the information in the application binary 802. Memory profiling block 810 carries out data-centric memory profiling; a non-limiting example is shown in FIG. 7. Memory configuration block 812 is a model that describes the memory hierarchy in order to simulate the memory behavior. With regard to simulation block 814, memory profiling in block 810 will be generated from simulation based on the memory model 812 and memory access log 806.

Figure 9:
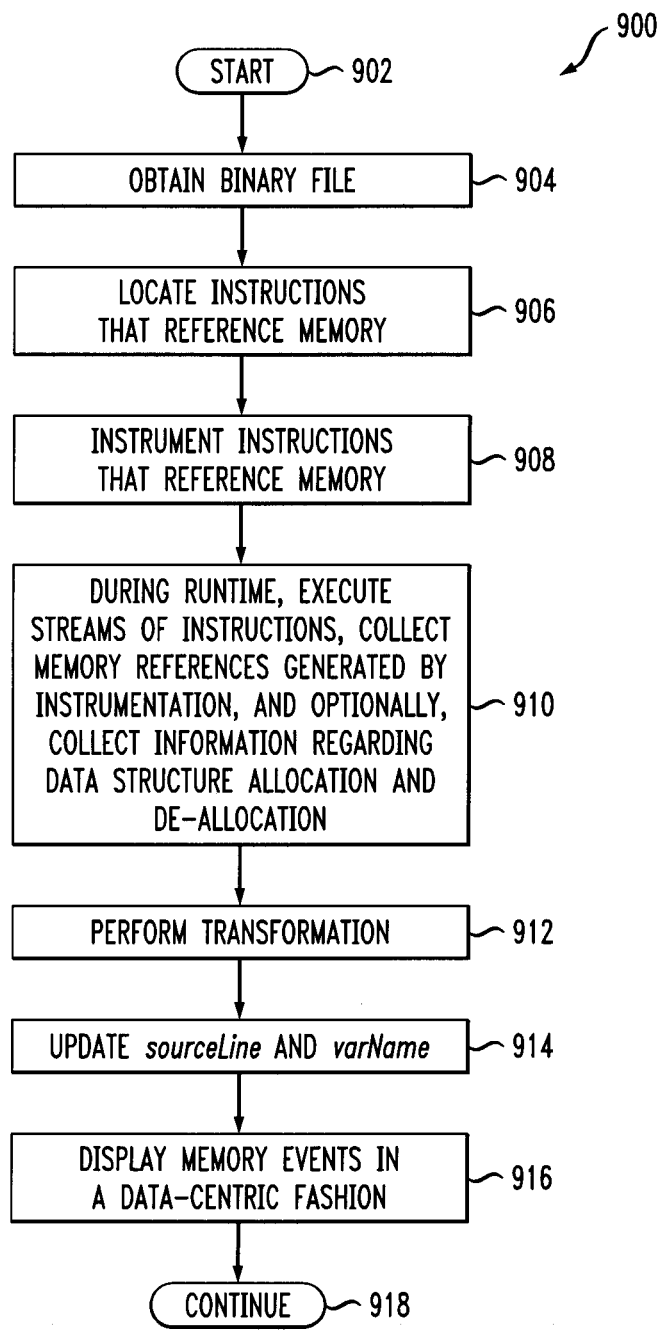
FIGS. 9-13 present flow charts of exemplary method steps, according to additional aspects of the invention.

With reference now to FIG. 9, in general terms, a method 900, according to an aspect of the invention, is depicted. The method begins in step 902. Optional steps 904-908 are discussed below. In step 910, during runtime of a binary program file, execute streams of instructions from the binary program file, typically, on one or more suitable hardware processors. Furthermore, also as per step 910, during the runtime of the binary program file, collect memory references generated by instrumentation applied to given ones of the instructions that refer to memory locations (for example, using runtime data collection engine 852). Step 912 includes performing a transformation, based on the executed streams of instructions and the collected memory references, to obtain a table (for example, with block 808). The table lists memory events of interest for active data structures for each function in the program file. The table, may be, for example, a linked list as described elsewhere herein, but this example is non-limiting and other kinds of tables can be used.

The transformation is performed to translate memory addresses for given ones of the instructions and given ones of the data structures into source file locations and variable names in a source file corresponding to the binary file. Optional step 914 is discussed below. Step 916 includes facilitating display of at least the memory events of interest (for example, by having one or more hardware processors 1402 interact with a suitable display 1406 as discussed below with respect to FIG. 14). The display is organized in a data-centric fashion, that is, to correlate the memory events of interest with corresponding ones of the data structures. Processing continues in step 918.

Although not shown in FIG. 9, optional additional steps can include facilitating programmer (or other user) interaction with the displayed data (displayed, for example, as in FIG. 7), and tuning memory performance of the program in response to the interaction with the data. The source code of the tuned program can be stored on a tangible computer-readable recordable storage medium, and can be compiled into executable code, which can also be stored on a tangible computer-readable recordable storage medium for subsequent execution by a hardware processor.

With regard to the aforementioned data-centric display, information collected can be very specific in terms of relating hardware system information directly to programming data structures, as opposed to the mere collection of statistics and/or information uncorrelated with respect to data structure. Unlike the mere correlation to a function and/or core region, in one or more embodiments, correlation is with respect to the data structure itself. Accordingly, in one or more embodiments, cache misses and other memory information can be precisely isolated into the specific data structure within the function. Mere isolation to a function is too large, in terms of granularity, to carry out suitable analysis. Thus, additional steps, not shown in FIG. 9, can include tuning memory performance of the program which has been analyzed, and executing the tuned program on one or more hardware processors.

In a preferred approach, the source file locations are line numbers, and the transformation is performed in accordance with relationship (1) above.

Optional additional step 904 includes obtaining the binary program file for analysis. Optional additional step 906 includes locating, in the binary program file, the given ones of the instructions that refer to the memory locations. Optional additional step 908 includes applying the instrumentation to the given ones of the instructions that refer to the memory locations.

The memory events of interest can be, for example, cache accesses, cache hits, and cache misses for the corresponding ones of the data structures.

Figure 10:
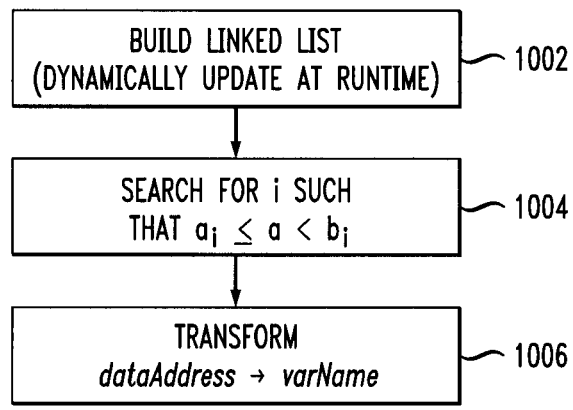

With reference to FIG. 10, step 912 could include, for example, performing the transformation dataAddress$\Rightarrow$ varName by carrying out steps 1002-1006. Step 1002 includes building the table. The table includes, for each varName, a virtual address range. Step 1004 includes, upon access of a given one of the memory locations that is associated with a given dataAddress, searching the table for an entry with one of the virtual address ranges which corresponds to the given one of the memory locations. Step 1006 includes transforming the given dataAddress to a corresponding varName. Note that FIG. 10 mentions a linked list but this is a non-limiting example of the more general case of a table. In a preferred but non-limiting approach, step 1004 includes, upon access of an address "a," searching the table with a runtime engine (for example, blocks 808 and 852) for an entry "i" such that $a_i \leq a < b_i$, in order to match the address "a" to a particular data structure $x_i$.

Optional step 914 includes updating entries in the table, corresponding to sourceLine and varName, subsequent to the transformation. In such a case, the table can be dynamically updated at runtime, as per the parenthetic in step 1002.

In some instances, step 910 can further include capturing information regarding data structure allocation and de-allocation with the instrumentation. The table is updated dynamically based on the information regarding data structure allocation and de-allocation, as per steps 910, 1002.

Figure 11:
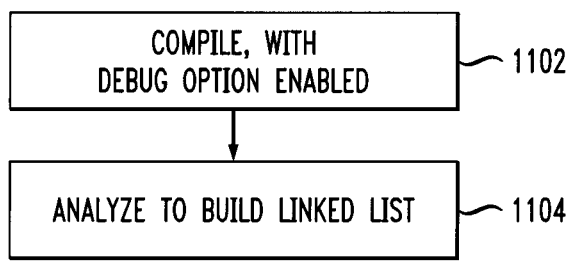

In at least some cases, at least some of the varName entries correspond to global variables. In such cases, the table can constructed by carrying out the steps in FIG. 11. Step 1102 includes compiling the source file with a debug option enabled to obtain the virtual address assigned to each of the global variables and corresponding size. Step 1104 includes analyzing the virtual address assigned to each of the global variables and the corresponding size to build the table (in linked list or other appropriate form).

Figure 12:
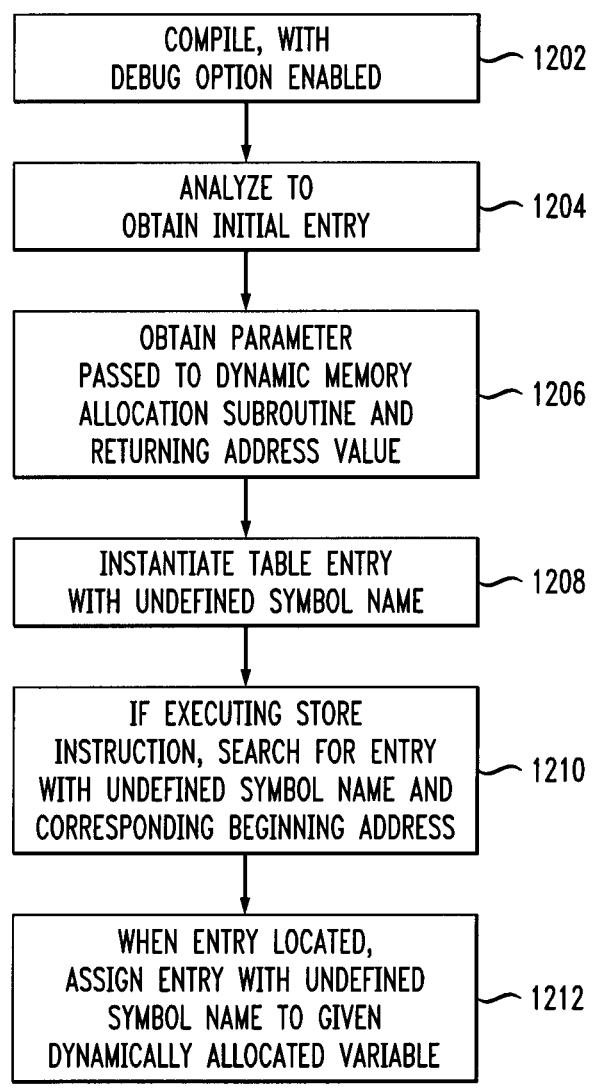

In at least some cases, at least some of the varName entries correspond to dynamically allocated variables. In such cases, the table can constructed by carrying out the steps in FIG. 12. Step 1202 includes compiling the source file with a debug option enabled to obtain the virtual address assigned to each of the dynamically allocated variables and corresponding size. Step 1204 includes analyzing the virtual address assigned to each of the dynamically allocated variables and the corresponding size to obtain an initial entry for a given one of the dynamically allocated variables. Step 1206 includes obtaining, with the instrumentation, a parameter passed to a dynamic memory allocation subroutine, and a corresponding returning address value X. Step 1208 includes, based on the obtaining of the parameter and the corresponding returning address value X, instantiating a table entry, with an undefined symbol name, in the table. Step 1210 includes, upon execution of a store instruction, searching the table for an entry with an undefined symbol name and having X as a beginning address of its range. Step 1212 includes, upon finding the entry with the undefined symbol name and having X as the beginning address of its range, assigning the entry with the undefined symbol name to the given one of the dynamically allocated variables.

In at least some cases, at least some of the varName entries correspond to stack variables. Mapping stack variables is discussed above with respect to FIG. 13.

One or more embodiments of the invention have one or both of the following characteristics: (1) ability to address general (i.e., non-simulation) application performance profiling (i.e., not limited to storing of address information, as in simulation tools such as DeRose et al., SIGMA: A Simulator Infrastructure to Guide Memory Analysis, IEEE/ACM SC2002 Conference), and (2) applicability to any event (i.e., not just to memory performance analysis tools, such as the aforementioned SIGMA).

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 14:
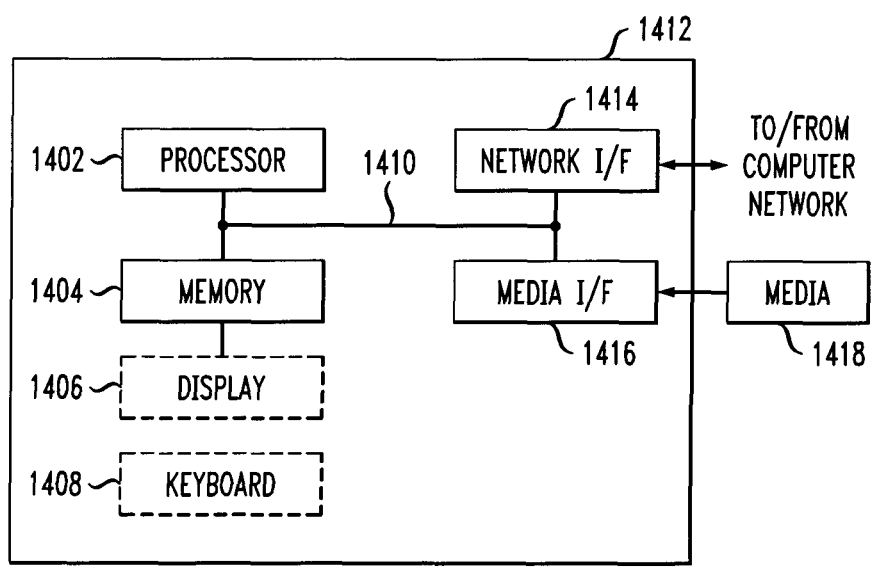
FIG. 14 depicts a computer system that may be useful in implementing one or more aspects and/or elements of the invention.

One or more embodiments can make use of software running on a general purpose computer or workstation. With reference to FIG. 14, such an implementation might employ, for example, a processor 1402, a memory 1404, and an input/output interface formed, for example, by a display 1406 and a keyboard 1408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1402, memory 1404, and input/output interface such as display 1406 and keyboard 1408 can be interconnected, for example, via bus 1410 as part of a data processing unit 1412. Suitable interconnections, for example via bus 1410, can also be provided to a network interface 1414, such as a network card, which can be provided to interface with a computer network, and to a media interface 1416, such as a diskette or CD-ROM drive, which can be provided to interface with media 1418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1418) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium (as distinct from a propagation medium or a disembodied signal) include a semiconductor or solid-state memory (for example memory 1404), magnetic tape, a removable computer diskette (for example media 1418), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1402 coupled directly or indirectly to memory elements 1404 through a system bus 1410. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1408, displays 1406, pointing devices, and the like) can be coupled to the system either directly (such as via bus 1410) or through intervening I/O controllers (omitted for clarity).

Network adapters such as network interface 1414 may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as JAVA™, Smalltalk, C++ or the like and conventional procedural programming languages, such as the "C" programming language, FORTRAN, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable recordable storage medium that can direct a computer or other programmable data processing apparatus to function in a particular manner, such that the instructions stored in the tangible computer-readable recordable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the distinct software modules can include any or all of the components shown in FIG. 8, including elements 802, 850, 804, 852, 806, 808, 810, 812, 814; data structures including data as shown in FIGS. 1-6; code to produce a display as in FIG. 7; and the like. The method steps can then be carried out using the distinct software modules of the system, as described above, executing on at least one hardware processor. Further, a computer program product can include a tangible computer-readable recordable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Thus, the means referred to herein may include: (i) hardware, (ii) software running on a general purpose computer, or (iii) combinations thereof; any of (i)-(iii) implement the specific techniques disclosed herein. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

during runtime of a binary program file, executing streams of instructions from said binary program file;

during said runtime of said binary program file, collecting memory references generated by instrumentation applied to given ones of said instructions that refer to memory locations;

performing a transformation, based on said executed streams of said instructions and said collected memory references, to obtain a table, said table listing memory events of interest for active data structures for each function in said binary program file, said transformation being performed to translate memory addresses for given ones of said instructions and given ones of said data structures into source file locations and variable names in a source file corresponding to said binary program file;

creating a data-centric profile, said data centric profile presenting memory performance data organized by said data structures defined at the source level of said binary program file for at least said memory events of interest using said table; and facilitating display of said data-centric profile, said display being organized to correlate said data structures with a memory architecture on which said binary program file is executed.

2. The method of claim 1, wherein said memory events of interest comprise cache accesses, cache hits, and cache misses for said corresponding ones of said data structures.

3. The method of claim 1, further comprising:
facilitating user interaction with said display;
based on said user interaction, tuning memory performance by modifying said source file to obtain a modified source file; and
storing said modified source file on a tangible computer-readable recordable storage medium.

4. The method of claim 1, wherein, in said performing step, said table comprises a linked list.

5. The method of claim 1, further comprising the additional step of providing a system, wherein said system comprises distinct software modules, each of said distinct software modules being embodied on a tangible computer-readable recordable storage medium, and wherein said distinct software modules comprise a runtime data collection engine module and a symbolic mapping module;
said step of collecting said memory references is carried out by said runtime data collection engine module executing on at least one hardware processor;
said step of performing said transformation is carried out at least by said symbolic mapping module executing on said at least one hardware processor; and
said step of facilitating display comprises said at least one hardware processor interacting with a display device.

6. The method of claim 1, wherein said given ones of said instructions correspond to one or more portions of code in said binary program file selected prior to executing said streams of instructions from said binary program file.

7. The method of claim 6, wherein said one or more portions of code refer to one or more memory locations of interest.

8. The method of claim 1, wherein said memory performance data comprises information relating to load and store misses for said data structures.

9. The method of claim 1, wherein said memory performance data comprises information relating to access times for said data structures.

10. The method of claim 1, wherein said display comprises:
a first portion comprising a list of said memory events of interest and one or more of said data structures associated with each of said memory events of interest; and
a second portion comprising source code for said binary program file.

11. The method of claim 10, wherein said facilitating step further comprises receiving a user selection of a given one of said memory events of interest, wherein responsive to said user selection said second portion of said display highlights a section of said source code for said binary program file corresponding to said given one of said memory events of interest.

12. The method of claim 11, wherein responsive to said user selection, said display further comprises a third portion comprising memory performance data corresponding to said given one of said memory events of interest.

13. The method of claim 10, wherein said list further comprises one or more functions of said binary program file associated with said one or more of said data structures associated with each of said memory events of interest.

14. The method of claim 1, wherein said table is updated dynamically based on information regarding allocation and de-allocation of one or more of said data structures.

15. The method of claim 1, wherein said display is further organized to correlate said data structures with hardware system information other than the memory architecture on which said binary program file is executed.

16. The method of claim 1, wherein said data-centric profile indicates one or more of said data structures which cause poor utilization of said memory architecture relative to other ones of said data structures.

17. A computer program product comprising a tangible computer readable recordable storage medium including computer usable program code, said computer program product including:
computer usable program code for, during runtime of a binary program file, executing streams of instructions from said binary program file;
computer usable program code for, during said runtime of said binary program file, collecting memory references generated by instrumentation applied to given ones of said instructions that refer to memory locations;
computer usable program code for performing a transformation, based on said executed streams of said instructions and said collected memory references, to obtain a table, said table listing memory events of interest for active data structures for each function in said binary program file, said transformation being performed to translate memory addresses for given ones of said instructions and given ones of said data structures into source file locations and variable names in a source file corresponding to said binary program file;
computer usable program code for creating a data-centric profile, said data centric profile presenting memory performance data organized by said data structures defined at the source level of said binary program file for at least said memory events of interest using said table; and
computer usable program code for facilitating display of said data-centric profile, said display being organized to correlate said data structures with a memory architecture on which said binary program file is executed.

18. The computer program product of claim 17, wherein said memory events of interest comprise cache accesses, cache hits, and cache misses for said corresponding ones of said data structures.

19. The computer program product of claim 17, further comprising distinct software modules, each of said distinct software modules being embodied on said tangible computer-readable recordable storage medium, said distinct software modules comprising a runtime data collection engine module and a symbolic mapping module;
wherein:
said runtime data collection engine module comprises said computer usable program code for collecting said memory references; and
said symbolic mapping module comprises at least a portion of said computer usable program code for performing said transformation.

20. The computer program product of claim 17, wherein said given ones of said instructions correspond to one or more portions of code in said binary program file selected prior to executing said streams of instructions from said binary program file.

21. An apparatus comprising:

a memory; and at least one processor, coupled to said memory, and operative to:

during runtime of a binary program file, execute streams of instructions from said binary program file;

during said runtime of said binary program file, collect memory references generated by instrumentation applied to given ones of said instructions that refer to memory locations;

perform a transformation, based on said executed streams of said instructions and said collected memory references, to obtain a table, said table listing memory events of interest for active data structures for each function in said binary program file, said transformation being performed to translate memory addresses for given ones of said instructions and given ones of said data structures into source file locations and variable names in a source file corresponding to said binary program file;

create a data-centric profile, said data centric profile presenting memory performance data organized by said data structures defined at the source level of said binary program file for at least said memory events of interest using said table; and facilitate display of said data-centric profile, said display being organized to correlate said data structures with a memory architecture on which said binary program file is executed.

22. The apparatus of claim 21, further comprising a tangible computer-readable recordable storage medium having distinct software modules embodied thereon, wherein said distinct software modules comprise a runtime data collection engine module and a symbolic mapping module; wherein:

said at least one processor collects said memory references by executing said runtime data collection engine module; and said at least one processor performs said transformation by executing at least said symbolic mapping module.

23. The apparatus of claim 21, wherein said given ones of said instructions correspond to one or more portions of code in said binary program file selected prior to executing said streams of instructions from said binary program file.

24. An apparatus having a processor comprising:

means for, during runtime of a binary program file, executing streams of instructions from said binary program file;

means for, during said runtime of said binary program file, collecting memory references generated by instrumentation applied to given ones of said instructions that refer to memory locations;

means for performing a transformation, based on said executed streams of said instructions and said collected memory references, to obtain a table listing memory events of interest for active data structures for each function in said binary program file, said transformation being performed to translate memory addresses for given ones of said instructions and given ones of said data structures into source file locations and variable names in a source file corresponding to said binary program file;

means for creating a data-centric profile, said data centric profile presenting memory performance data organized by said data structures defined at the source level of said binary program file for at least said memory events of interest using said table; and means for facilitating display of said data-centric profile, said display being organized to correlate said data structures with a memory architecture on which said binary program file is executed.

25. The apparatus of claim 24, wherein said given ones of said instructions correspond to one or more portions of code in said binary program file selected prior to executing said streams of instructions from said binary program file.

* * * * *